United States Patent
Couturier et al.

(10) Patent No.: US 8,844,518 B2
(45) Date of Patent: Sep. 30, 2014

(54) SOLAR RECEIVER ABSORBER AND SOLAR RECEIVER COMPRISING AT LEAST ONE SUCH ABSORBER

(75) Inventors: Raphael Couturier, Sassenage (FR); Alain Ferriere, Llo (FR); Franck Pra, Le Gua (FR); Patrice Tochon, Uriage (FR); Fabien Vidotto, Fontaine (FR)

(73) Assignees: Commissariat a l'energie atomique et aux energies alternatives, Paris (FR); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 13/703,504

(22) PCT Filed: Jun. 10, 2011

(86) PCT No.: PCT/EP2011/059719
§ 371 (c)(1),
(2), (4) Date: Feb. 28, 2013

(87) PCT Pub. No.: WO2011/154534
PCT Pub. Date: Dec. 15, 2011

(65) Prior Publication Data
US 2013/0152917 A1   Jun. 20, 2013

(30) Foreign Application Priority Data

Jun. 11, 2010 (FR) .................................... 10 54660

(51) Int. Cl.
| F24J 2/24 | (2006.01) |
| F24J 2/07 | (2006.01) |
| F24J 2/16 | (2006.01) |
| F24J 2/28 | (2006.01) |
| F24J 2/34 | (2006.01) |
| F24J 2/46 | (2006.01) |

(52) U.S. Cl.
CPC .. *F24J 2/242* (2013.01); *F24J 2/07* (2013.01); *F24J 2/16* (2013.01); *F24J 2/24* (2013.01); *F24J 2/28* (2013.01); *F24J 2/34* (2013.01); *F24J 2/4652* (2013.01); *F24J 2/4654* (2013.01); *Y02E 10/41* (2013.01); *Y02E 10/44* (2013.01); *F24J 2/4641* (2013.01)
USPC ............ 126/663; 126/674; 126/676; 126/655

(58) Field of Classification Search
CPC ......... Y02E 10/44; Y02E 10/41; Y02E 10/46; F24J 2/07; F24J 2/16; F24J 2/24; F24J 2/28; F24J 2/34; F24J 2/242; F24J 2/4641; F24J 2/4652; F24J 2/4654; F24J 2/0483; F24J 2/05; F24J 2/48
USPC ......... 126/663, 674, 676, 643, 644, 645, 655, 126/670
See application file for complete search history.

(56) References Cited

U.S. PATENT DOCUMENTS

2007/0101989 A1* 5/2007 Strathman ..................... 126/636
2008/0011290 A1   1/2008 Goldman et al.

(Continued)

FOREIGN PATENT DOCUMENTS

| DE | 102 48 064 A1 | 4/2004 |
| EP | 1 947 401 A1 | 7/2008 |
| WO | WO 2010/011689 A2 | 1/2010 |

OTHER PUBLICATIONS

International Search Report issued Nov. 24, 2011 in PCT/EP2011/059719.

(Continued)

Primary Examiner — Alfred Basichas
(74) Attorney, Agent, or Firm — Oblon, Spivak, McClelland, Maier & Neustadt, L.L.P.

(57) ABSTRACT

A solar power tower solar receiver absorber including: an enclosure; at least one panel configured to be illuminated by solar flux; a core made of at least one material with heat conductivity at least partially encompassed by the enclosure; and a plurality of tubes passing through the core and extending substantially in a parallel direction with respect to the panel configured to be illuminated. The tube is configured for circulation of a fluid to be heated, for example a gas for operating a gas turbine.

16 Claims, 9 Drawing Sheets

(56) References Cited

U.S. PATENT DOCUMENTS

| | | |
|---|---|---|
| 2011/0186043 A1 | 8/2011 | Diaz et al. |
| 2013/0125873 A1 | 5/2013 | Pra et al. |
| 2014/0000581 A1 | 1/2014 | Couturier et al. |

OTHER PUBLICATIONS

French Preliminary Search Report issued Feb. 25, 2011 in Patent Application No. 1054660 with English translation of categories of cited documents.

J. Karni, et al. "The "Porcupine": A Novel High-Flux Absorber for Volumetric Solar Receivers" J. Solar Energy Engineering, vol. 120, 1998, pp. 85-95.

Thomas Fend, et al., "Porous materials as open volumetric solar receivers: Experimental determination of thermophysical and heat transfer properties", Energy, 29 (5-6), 2004, pp. 823-834.

Didier Haillot, et al., "Storage composites for the optimization of solar water heating systems", Chemical Engineering Research and Design, 86 (6), 2008, pp. 612-617.

Peter Heller, et al., "Test and evaluation of a solar powered gas turbine system", Solar Energy, 80, 2006, pp. 1225-1230.

Akira Hoshi, et al., "Screening of high melting point phase change materials (PCM) in solar thermal concentrating technology based on CLFR", Solar Energy, 79, 2005, pp. 332-339.

J. Karni, et al., "The DIAPR: A High-Pressure, High-Temperature Solar Receiver", Solar Energy Engineering, 119, 1997, pp. 74-78.

A. Kribus, et al., "Inherent Limitations of Volumetric Solar Receivers", ASME Journal of solar Energy Engineering, 118, 1996, pp. 151-155.

S. Pincemin, et al., "Highly conductive composites made of phase change materials and graphite for thermal storage", Solar Energy Materials & Solar Cells, 92, 2008, pp. 603-613.

S. Pincemin, et al., "Elaboration of Conductive Thermal Storage Composites Made of Phase Change Materials and Graphite for Solar Plant", Journal of Solar Energy Engineering, 130 (1), 2008, pp. 1-5.

Wolf-Dieter Steinmann, et al., "Latent heat Storage Systems for Solarthermal Power Plants and Process Heat Applications", Proceedings of $14^{th}$ International SolarPACES Symposium, 2008, pp. 1-8.

M. Vrinat, et al., "Experimental Qualification of a High Temperature Air Solar Absorber Based on Compact Heat Exchanger Technology", Proceedings of $15^{th}$ International SolarPACES Symposium, Sep. 15-18, 2009, 7 pages.

B. D'Utruy, et al., "Une Chaudière solaire à air à haute température: Projet Sirocco", Revue Generale de Thermique, No. 269, May 1984, 12 pages (With English Translation entitled "A High-Temperature Solar Boiler: Sirocco Project").

\* cited by examiner

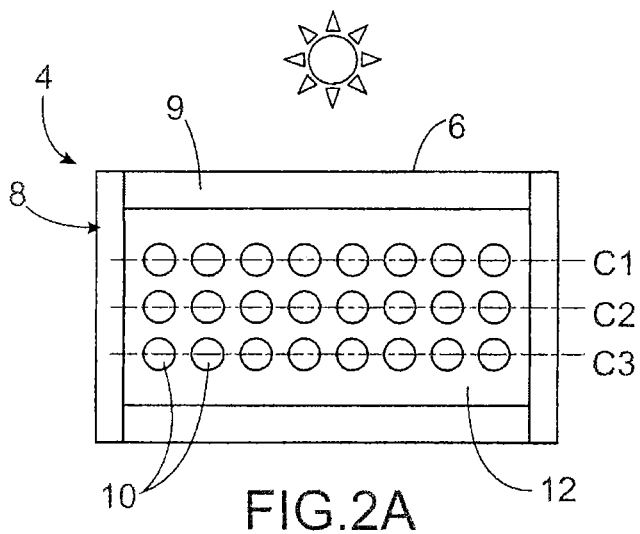
FIG.2A
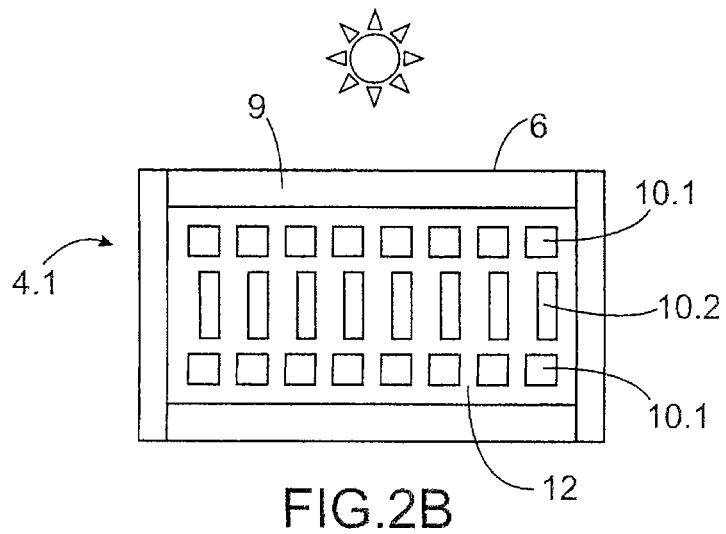
FIG.2B
FIG.2C
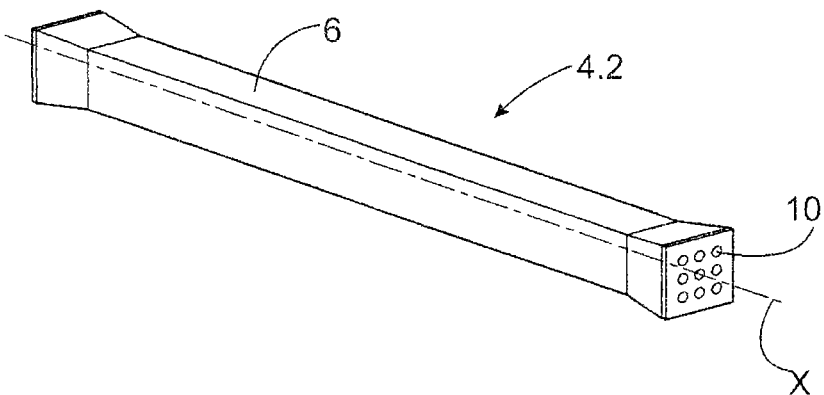

SOLAR RECEIVER ABSORBER AND SOLAR RECEIVER COMPRISING AT LEAST ONE SUCH ABSORBER

FIELD OF THE INVENTION AND STATE OF THE RELATED ART

The present invention relates to a solar receiver absorber, a solar receiver comprising at least one such absorber and a concentrating solar power plant comprising at least one such receiver, more specifically a solar power tower.

Concentrating solar thermal technology consists of using solar radiation to heat a heat transfer fluid acting as a heat source in a thermodynamic cycle. Concentration makes it possible to reach temperatures of varying levels and thus benefit from varying degrees of thermodynamic conversion efficiency.

Typically, there are four categories of Concentrating Solar Power (CSP) systems: line-focus parabolic trough collectors, linear Fresnel concentrators, central receiver tower systems and mobile-focus parabolic receivers.

A solar power tower particularly comprises a solar receiver receiving solar radiation transmitted by mirrors referred to as heliostats. The solar receiver is the site where the solar radiation is converted into sensible heat. It acts as a heat exchanger wherein the heat is taken up exclusively in the form of radiation absorbed by a panel and diffused by conduction in the inner exchanger structure. The transfer fluid or heat exchange fluid circulates in the inner structure and is heated by convective exchange.

The solar receiver is subject to very harsh conditions. Indeed, it is subject to a high operating temperature, thermal gradients through the inner structure thereof associated with the conductive transfer of a high heat flux, and rapid wide-ranging temperature variations, particularly during cloudy spells.

Frequently, a receiver structure comprises a plurality of juxtaposed tubes wherein the transfer fluid circulates, a portion of the surface of these tubes collecting the solar radiation with juxtaposed tubes. This technique is particularly suitable when the transfer fluid is a liquid, such as liquid water, oil or molten salts. But, in the case of gas, such as water vapour or air, the exchange coefficient at the panel drops, the lighting on one face of the tubes by the high solar flux gives rise to a significant difference in temperature between the illuminated face and the rear face, hence deformations suitable for resulting in tube rupture.

In order to eliminate the appearance of a significant difference in temperature between the face which is subject to the solar radiation and that which is not, volumetric absorber receivers have been proposed. An example of such a receiver is described in the document "The "Porcupine": A Novel High-Flux Absorber For Volumetric Solar Receiver", J. Karni, A. Kribus, R. Rubin, P. boron, in J. Solar Energy Engineering, 1998, Vol. 120/85-95. This receiver comprises a crop of pins wherein the axes are substantially aligned with the light rays and a transfer fluid flows in the vicinity of these heated pins, causing the heating thereof. This type of receiver offers a high transfer efficiency; however, the design thereof is complex and it is expensive and has not been tested in large-scale industrial applications.

Consequently, one aim of the present invention is that of offering a solar receiver absorber having a low thermal gradient within the structure thereof and suitable for handling sudden variations in solar radiation conditions.

DESCRIPTION OF THE INVENTION

The aim described above is achieved by a solar receiver absorber comprising a plurality of tubes in which a transfer gas flows, a rigid enclosure and a core made of a material with good heat conductivity and in which the tubes are integrated.

The enclosure ensures that the tubes are mechanically secured and the core carries out heat transfer by conduction and stores heat, so as to reduce the effects of sudden temperature variation. Indeed, when a cloud passes, due to the thermal inertia of the core, the temperature within the absorber drops progressively and relatively slowly, limiting the stress applied to the tubes. The thermal inertia of the material also plays a role when the cloud disappears, since it prevents an excessively sudden temperature rise. Moreover, due to the good thermal conductivity thereof, the material returns the heat stored homogeneously. Furthermore, it provides a low thermal gradient within the absorber.

The progressive, slow temperature variation also makes it possible to protect the elements downstream from the receiver, which are also subject to temperature variations. Moreover, with the invention, it is possible to simplify the thermodynamic conversion modules of concentrating solar power plants, since the temperature variations of the fluid at the absorber outlet are smoothed.

In other words, transfer fluid tubes made of a material suitable for handling rapid lighting condition variations are incorporated.

This substance acts as a heat flux heat sink, and provides short-term heat storage.

In one advantageous example, it is also possible to incorporate an additional storage system so as to obtain more heat storage, and thus slow down the rate of temperature decline when the solar flux disappears. For example, it may consist of a base plate made of a similar material to the core situated at the rear face of the face intended to receive the solar flux. Said material base plate may be equivalent to more than 10%, 20% or 50% by mass of the material forming the additional core. It is understood that said base plate is not traversed by the tubes.

The subject-matter of the present invention is thus a solar power tower solar receiver absorber comprising an enclosure wherein at least one panel is intended to be illuminated, a core made of at least one material with good heat conductivity at least partially encompassed by the enclosure and at least one tube passing through the core and extending substantially in a parallel direction with respect to the panel intended to be illuminated, said tube being configured for the circulation of a fluid to be heated. Advantageously, the at least one material of the core has a heat conductivity coefficient greater than or equal to 100 $W \cdot m^{-1} \cdot K^{-1}$ at ambient temperature.

The core is made of a solid and opaque material, at ambient temperature and at the operating temperatures of the absorber.

The heat being transferred to the fluid via the enclosures followed by the core and the panel of the tube enables the use of a pressurised fluid, for example greater than 5 Bar when hot in the tubes, which does not allow devices wherein the tubes are transparent and the fluid and heated directly by the luminous flux impacting the tubes.

The absorber according to the invention advantageously comprises a plurality of tubes extending substantially in a parallel direction with respect to the panel to be illuminated. The tubes are preferably distributed into a plurality of layers, each layer comprising a plurality of tubes, the layers being stacked along a substantially normal direction with respect to the panel to be illuminated.

In one alternative embodiment, the absorber according to the present invention comprises an additional part made of a material suitable for storing heat in contact with the core, said additional part not being traversed by tubes. The additional part is for example arranged opposite the panel to be illuminated with respect to the core. The additional part may be integral with the core, or form a reservoir containing a phase-change material or a molten metal. The reservoir may for example consist of a porous material impregnated with a phase-change material.

Preferably, the enclosure and the tubes are made of the same material and are, for example made of stainless steel or a refractory material and the core is made of copper, tungsten alloy or nickel alloy.

The absorber according to the present invention may be produced by diffusion welding, advantageously by hot isostatic pressing.

The subject-matter of the present invention is also a solar power tower solar receiver comprising at least one absorber according to the present invention, an inlet collector distributing the fluid in the absorber and an outlet collector.

In one particularly advantageous embodiment, the receiver comprises a plurality of absorbers arranged side by side forming a paving, a sufficient gap being provided between the adjacent absorbers so as to prevent contact between absorbers in the event of expansion, each absorber further comprising its own fluid circuit wherein a fluid to be heated by the solar flux is intended to flow, the fluid circuits of the absorbers being interconnected.

The fluid network of each absorber comprises a fluid supply inlet and discharge outlet, said inlets and outlets preferably opening into a face of the absorber opposite the face intended to be illuminated.

The subject-matter of the present invention is also a solar power tower comprising a tower, at least one receiver according to the present invention, mounted on said tower, the at least one tube of the receiver being connected at the inlet to a fluid supply and at the outlet to a system using the heated fluid, at least one heliostat facing the receiver.

The heated fluid may be a gas, for example air, and the system using the heated gas is a gas turbine.

BRIEF DESCRIPTION OF THE FIGURES

The present invention will be understood more clearly using the following description and appended figures wherein:

FIG. 2A is a cross-section view of an example of an embodiment of a solar receiver absorber according to the present invention, FIG. 2B is a cross-section view of an alternative embodiment in FIG. 2A, FIG. 2C is a perspective view of an absorber according to the present invention comprising three layers of three tubes.

DETAILED DESCRIPTION OF PARTICULAR EMBODIMENTS

The absorber according to the present invention is particularly suitable for heating gas; however, it is also suitable for heating liquid. Consequently, the gas or liquid is hereinafter referred to as "fluid".

Figure 1A:
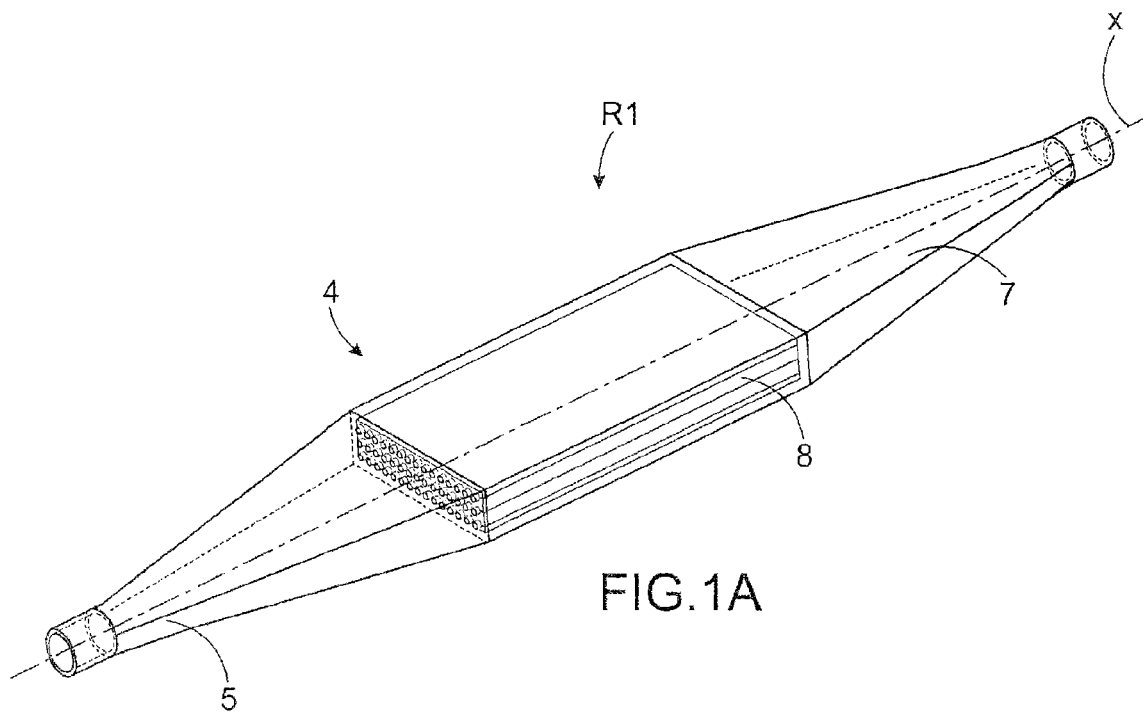
FIG. 1A is a perspective view of a receiver according to the invention according to a first embodiment.
Figure 1B:
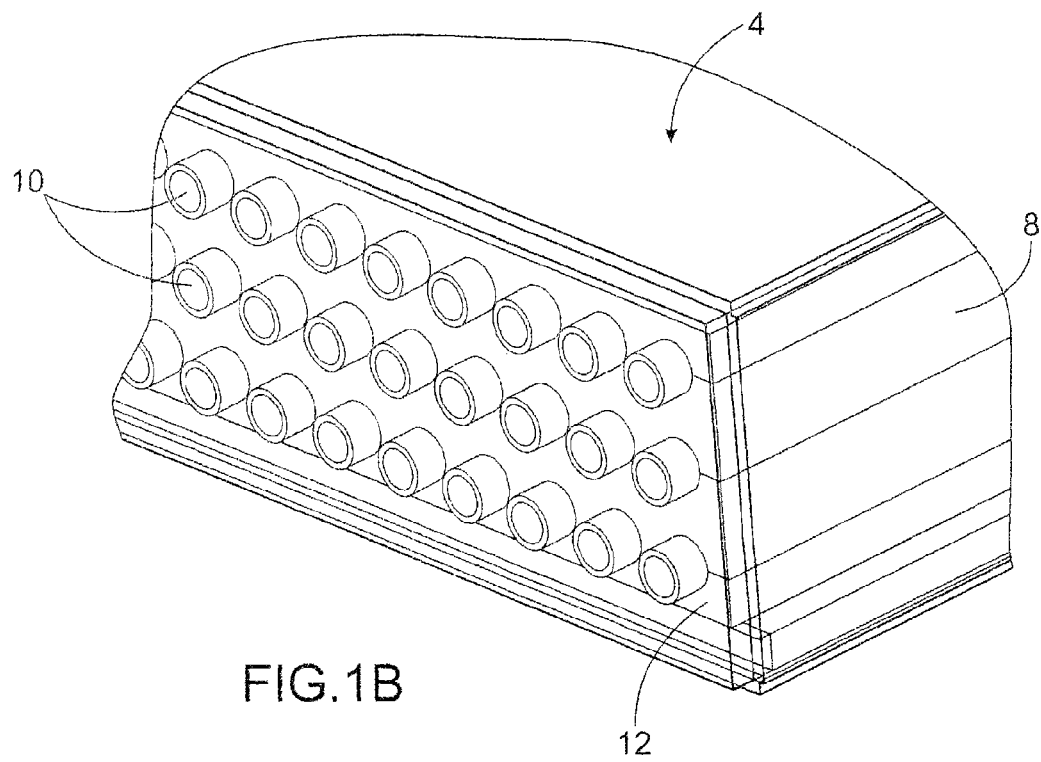
FIG. 1B is a detailed view of FIG. 1A.

FIGS. 1A and 1B show a schematic representation of a solar receiver R1 according to the present invention comprising a solar absorber 4 according to the present invention, one example of which can particularly be seen in FIG. 2A.

The receiver comprises an inlet collector 5 which distributes the fluid in the absorber 4, and an outlet fluid collector 7 from the absorber 4. The absorber 4 is the site of the heat exchange between the concentrated solar flux impacting one of the faces thereof and the fluid circulating inside ducts 10 placed in a core 12 of the absorber 4. The tubes 10 and the core 12 are enclosed in an alloy acting as an enclosure 8 resisting the high panel temperature generated by the impact of the solar flux. FIG. 1B shows a detailed view of the inlet of the absorber 4, the enclosure 8 being shown transparently.

FIG. 2A shows a section view of an absorber 4 according to the present invention. In the example shown, the shape thereof is substantially that of a parallelepiped having a longitudinal axis X, this axis is shown in FIG. 2C and in FIGS. 5A to 5C.

The absorber may have any shape; however, it preferably comprises at least one substantially plane surface for optimum reception of the solar flux.

The absorber comprises a face 6 for receiving the solar radiation reflected by heliostats (not shown), the solar radiation is represented schematically by the sun. However, it should be noted that the face 6 is not generally illuminated directly or at the very least mainly by the sun.

Figure 8:
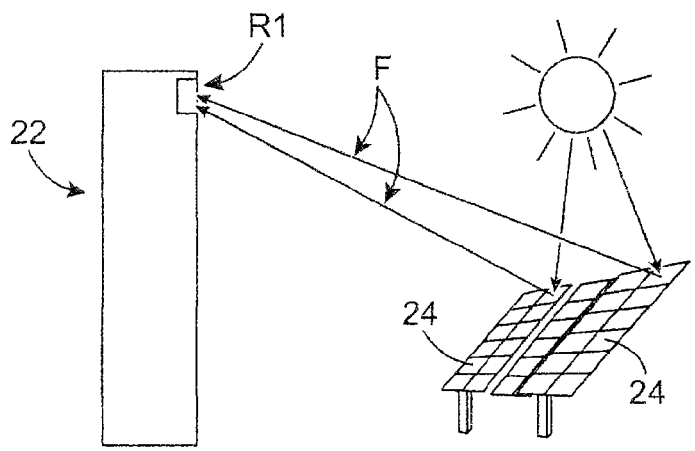
FIG. 8 is a schematic representation of a solar power plant according to the present invention.

FIG. 8 shows a schematic representation of a solar power plant according to the invention comprising heliostats 24 facing the receiver R1 mounted at the top of a tower 22. The actual trajectory of the solar flux F is returned and concentrated by the heliostats 24 to the receiver R1.

As described above, the absorber comprises an enclosure 8 in the shape of a parallelepiped wherein one panel 9 comprises the face to be illuminated 6, tubes 10 extending along the axis X and a core 12 filling the enclosure 8 and traversed by the tubes 10. The core 12 is made of a material offering good heat conductivity.

The core 12 provides heat storage, the duration of this storage varying according to the inertia of the core material. Furthermore, a material with a high conduction coefficient ensuring a homogeneous core temperature is chosen. This homogeneous temperature ensures that the absorber is subject to low levels of thermomechanical stress in the thickness. The heat conduction coefficient is advantageously greater than or equal to 100 $W \cdot m^{-1} \cdot K^{-1}$, this value is given for ambient temperature.

The core is made of a solid and opaque material, at ambient temperature and at the absorber operating temperatures, ensuring continuous contact between the core and the tubes and ensuring temperature homogeneity about the tubes.

The core comprises at least one metal or metal-based alloy, preferably a metal or metal alloy based on copper and/or aluminium.

Alternatively, the core may be made of magnesium, silver, gold, zinc, tungsten.

The alloys may be brass, bronze, Al/Si and Al/Cu alloys, Monel (70Ni-30Cu), copper-based composites with alumina dispersoids (Glidcop).

The tubes are, in the example shown, divided into a plurality of layers c1, c2, c3 parallel with the face to be illuminated 6. The tubes in each layer are arranged substantially parallel next to each other.

In the example shown, the tubes of the various layers are aligned in a column. Alternatively, the layers may be arranged in a staggered fashion.

The enclosure 8 is suitable for mechanically securing the absorber. As such, it is made of a material suitable for withstanding high temperatures, particularly the panel thereof supporting the face intended to be illuminated 6, since it is subject to solar radiation. The high-temperature-resistant enclosure acts as protection for the core wherein the high-conductivity materials could be damaged in contact with the high-temperature air, for example they could be subject to a very considerable oxidation and damage.

Alternatively, making the enclosure from a plurality of materials could be envisaged. For example, a "high-temperature" alloy could be used for the exposed face and less resistant alloys elsewhere for the other faces.

The tubes 10 are also configured to withstand high temperatures and oxidation since they transport a high-temperature fluid. Preferably, the same material is chosen for the enclosure and for the tubes, simplifying production.

For temperatures below 700° C., the enclosure and the tubes may be made of stainless steel. For higher temperatures, refractory materials or nickel-based alloys may be used. These materials include, non-exhaustively, Inconel 600®, Inconel 800®, Inconel 617®, Haynes 230®, Haynes 120®.

In the example in FIG. 2A, the tubes have circular cross-sections; however, this shape is in no way limiting. Moreover, the tubes are not necessarily identical.

In FIG. 2B, the absorber 4.1 comprises tubes having a rectangular cross-section 10.1 and tubes having a square cross-section 10.2. Advantageously, the tubes having a rectangular cross-section are arranged such that the large dimension thereof is normal with respect to the face to be illuminated 6, heat exchanges are enhanced since the exchange surface area between the core and the tubes in increased and compactness is increased.

The tubes may be straight, corrugated or multi-staged. In the latter case, for example a tube may have a portion situated in the lower part and a portion in the part of the absorber shown in FIGS. 1A and 1B, and bends to connect these two portions.

FIG. 2C shows a perspective view of a further example of an absorber 4.2 comprising three layers of three tubes 10. In the example shown, the enclosure 8 comprises thicker longitudinal ends, for example this is obtained by machining the central part of the enclosure 8. This feature offers the advantages of having sufficient material to be able to weld the collectors at the ends, and obtain superior heat flux transfer in the central part of the enclosure. Indeed, the enclosure offers a lower heat conductivity to that of the core 12 and as such acts as a heat transfer barrier. If it is thinned, this barrier is reduced.

Figure 2D:
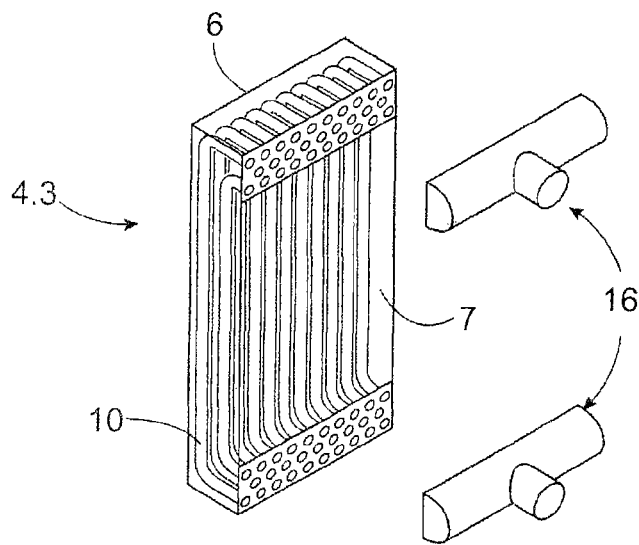
FIG. 2D is a perspective view of a further alternative embodiment of an absorber according to the present invention.

FIG. 2D shows an alternative embodiment 4.3 of the absorber in FIG. 2C, wherein the inlet and outlet of each tube 10 opens into the opposite face 7 of the face to be illuminated 6, and not in the end faces. The tubes 10 thus comprise a straight portion and two bends at the longitudinal ends.

Supply and discharge collectors 16 are also shown, which are intended to be connected to the tube inlets and outlets, respectively. This alternative embodiment offers the advantage of optimising the surface area exposed to the solar flux and prevents the fluid connections from direct exposure to the solar flux.

Figure 6:
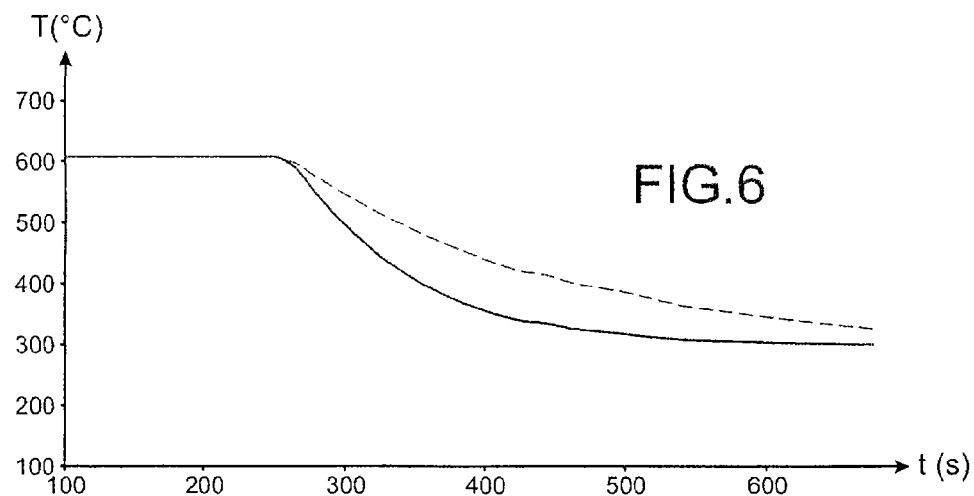
FIG. 6 is a graphic representation of the progression of the temperature measured inside the absorber in FIG. 2C.

FIG. 6 shows a graphic representation of the progression of the temperature T in ° C. in an absorber according to 2C and 5B as a function of the time t in seconds.

The curve CI represents the progression of the temperature of the fluid at the absorber outlet, for an inlet temperature of 20° C.

The curve CII represents the progression of the temperature of the panel 9 of the enclosure comprising the face 6 at the absorber inlet.

The curve CIII represents the progression of the temperature of the panel 9 at the centre of the absorber.

The curve CIV represents the progression of the temperature of the panel 9 of the enclosure at the absorber outlet.

At approximately t=250 s, the face to be illuminated 6 is no longer illuminated, for example due to the passage of a cloud. The transition from an illuminated state to a non-illuminated state is very rapid. However, with the invention, temperatures do not drop suddenly, but decline progressively. In particular, the temperature of the gas, due to the presence of the core, decreases very progressively, making it possible to reduce the thermal shocks in the absorber and in the downstream elements. It is noted that approximately 300 seconds are necessary to discharge the heat stored in the absorber.

The absorber in FIG. 2C, for which the temperature measurements are shown in FIG. 6, has the following features:
- it is in the shape of a parallelepiped 800 mm in length, 50 mm and 50 mm in height,
- the enclosure is made of 316L stainless steel,
- the core is made of pure copper,
- the tubes are 9 in number and made of 316L stainless steel, have an inner diameter of 8 mm and outer diameter of 10 mm inserted in the core,
- the whole was welded by hot isostatic pressing.

Figure 3:
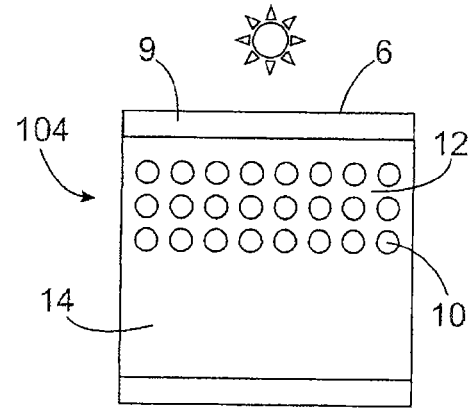
FIG. 3 is a cross-section view of a further example of an embodiment of an absorber according to the present invention comprising an additional heat storage area.

FIG. 3 shows a further example of an embodiment of an absorber 104 according to the present invention comprising an additional material mass 14 not traversed by tubes.

Preferably, the additional thermal mass 14 is arranged opposite the face to be illuminated 6 with respect to the tubes 12, and is thus not interposed between the solar flux and the tubes. Alternatively, it could be envisaged to arrange this mass between the tubes and the face intended to be illuminated.

In the example shown in FIG. 3, this additional thermal mass is integral with the core, the heat flux in this case is continuous between the core and the additional thermal mass 14. It may be envisaged to mount same on the core by welding, preferentially by hot isostatic pressing (HIP), by bonding or by mechanical means.

This additional thermal mass 14 is suitable for storing more heat, thus increasing the inertia of the absorber 104. The dimensions of the additional thermal mass 14 are adapted according to the storage time sought or the degree of temperature smoothing sought. Indeed, the greater the mass 14, the greater the heat potentially released in the event of the passage of a cloud, making it possible to slow down the temperature decline in the absorber further. Obviously, the dimensions of the additional thermal mass are also chosen according to the maximum size sought.

Figure 7:
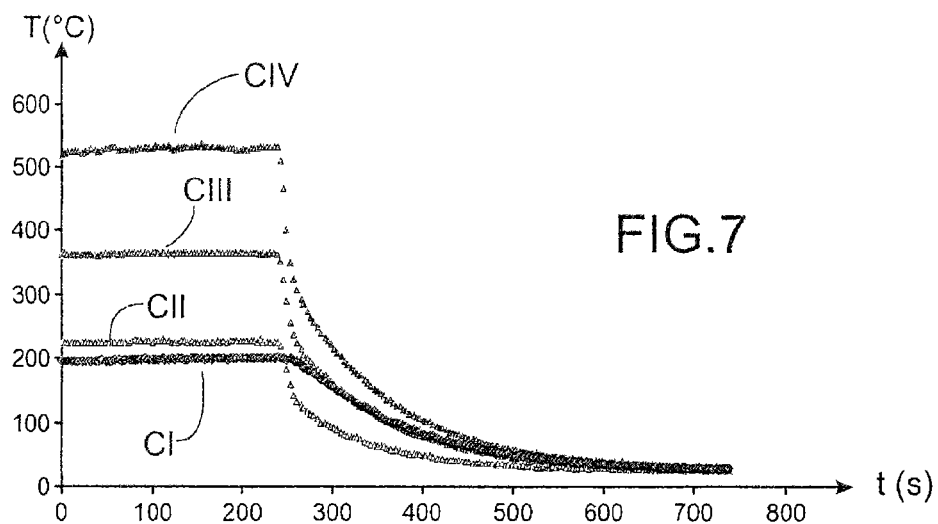
FIG. 7 is a graphic representation of the progression of the temperature modelled in an absorber such as that in FIG. 3 and in an absorber such as that in FIG. 2C.

FIG. 7 shows modelling of the progression of the temperature T in ° C. of the outlet fluid from the absorber 104 as a function of the time t in s in the case of an absorber according to FIG. 2C (solid line) and an absorber according to FIG. 3 (dash line). It is observed that the temperature drop deceleration effect is amplified further by the presence of this additional thermal mass 14, since the temperature decreases at approximately half the rate due to the presence of the additional thermal mass 14.

The temperature of 300° C. to which the fluids tend is equivalent to the inlet temperature of the fluid in the absorber.

The modelling in FIG. 7 was carried out accounting for a 30 mm thick additional thermal mass 14, equivalent to doubling of the copper mass.

Consequently, by choosing the dimensions of the additional thermal mass 14, it is possible to modify the thermal characteristics of the absorber simply.

Figure 4A:
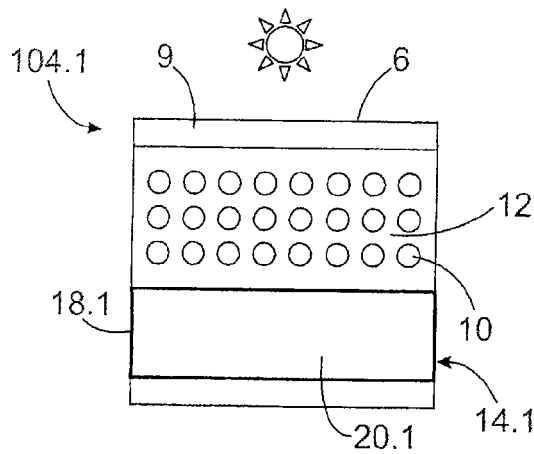
FIGS. 4A and 4B are cross-section views of alternative embodiments of an absorber according to the present invention using phase-change materials.

FIG. 4A shows an example of an embodiment of the absorber 104 according to the present invention wherein the additional thermal mass 14.1 is formed by a phase-change material confined between the core and the enclosure. The phase-change material may be aluminium or another molten metal, for example Ag or Sn or a molten salt (nitrate), wherein the phase-change temperature is suitable for the fluid outlet temperature.

The absorber comprises in this case a reservoir 18.1 mounted on the core opposite the face to be illuminated 6 filled with a phase-change material 20.1. This reservoir is configured to confine the phase-change material 20.1 when it turns into the liquid state.

In this example of an embodiment, heat is stored in the form of sensible and latent heat.

Figure 4B:
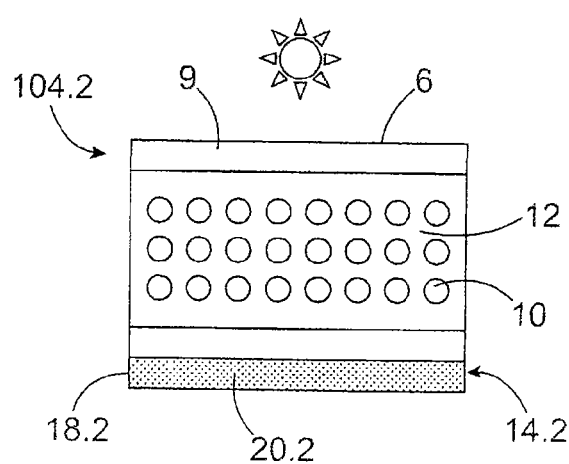

FIG. 4B shows an alternative embodiment 104.2 of the absorber in FIG. 4A, in which the additional thermal mass 14.2 is a porous structure 18.2 impregnated with a phase-change material 20.2. The porous structure 18.2 may be a nickel or graphite foam.

The additional thermal mass 14.2 may then be directly bonded or soldered onto the core. In the case of bonding, the adhesive selected provides good heat conductivity.

The absorber according to the present invention provides intrinsic protection of the receiver. Indeed, the thermal inertia of the core prevents a sudden temperature variation in the receiver elements. Moreover, due to good heat conduction in the core, there is a low temperature gradient in the thickness and the core thus transfers the stored heat homogeneously. The tubes are also all subject to the same panel temperature. In this case, the tubes are no longer subject to very significant thermal cycling, for example during a cloudy spell. For example, in the absorber in FIG. 2C, a temperature gradient merely less than 5° C. was measured in the thickness of the absorber for a max flux of 300 kW/m$^2$.

The absorber according to the present invention also offers protection of the components situated downstream from the receiver in the direction of fluid circulation, since the gas outlet temperature of the receiver varies progressively and more slowly in the case of alternating cloudy spells. In this case, this progressive variation does not generate severe thermal transients in the components situated downstream from the receiver.

The progressive and slower decline in the fluid temperature is of particular interest if the heated gas supplies a gas turbine. Indeed, in gas turbines according to the prior art, to remedy these alternating cloudy spells, an additional combustion chamber is envisaged to maintain the gas temperature. By means of the invention, it is easier to regulate the combustion chamber since the inlet temperature transients are slow. Moreover, the components upstream from the absorber have a greater service life since they are subject to less operating condition variations.

Examples of methods for producing the receiver according to the present invention will now be described.

The receiver and more specifically the absorber according to the present invention may be produced by drilling ducts in the core, inserting tubes and assembling the enclosure by welding.

It is also possible to envisage assembling simple elementary parts thus avoiding drilling by machining.

In the case of the assembly of elementary parts, the assembly may be obtained by soldering or fusion welding using various power sources, such as an electric arc and high-energy beams.

Particularly advantageously, the absorber according to the present invention may be produced by diffusion welding, and more advantageously by hot isostatic pressing, hereinafter referred to as HIP.

The diffusion welding assembly technique is well-known and will only be described briefly herein.

Diffusion welding consists of applying, at a high temperature and for a given time, pressure on the surfaces to be assembled. Using this technique, material continuity is obtained between the elementary parts, by removing any gaps and porosity under the combined effect of temperature and force.

With the diffusion welding embodiment, the absorber does not have any areas of lower temperature resistance, since addition of materials with a low melting point, required for soldering, is avoided.

The absorber according to the present invention thus has particularly strong junctions, since it has no weakness at the joins and the risks of leakage are avoided.

Moreover, it is possible to produce an absorber with various materials to dissociate the required functions and optimise each of them. As described above, a corrosion-proof material at high temperatures to produce the ducts in contact with the fluid, a high heat conductivity material to produce the core, and an enclosure in contact with the solar flux suitable for withstanding high temperatures are chosen. Furthermore, by means of diffusion welding assembly, junctions may be made between metal alloys which are not suitable for welding with conventional techniques, for example copper and stainless steel or a nickel or tungsten-based alloy and steel.

In the particularly advantageous case of HIP assembly, the elementary parts are for example sheets, plates, shells, optionally curved tubes. By producing the absorber according to the present invention by HIP, particularly complex geometries can be obtained.

Moreover, by means of HIP, it is possible to produce large absorbers simply, which is of particular interest in the case of thermal power plants.

Figure 5A:
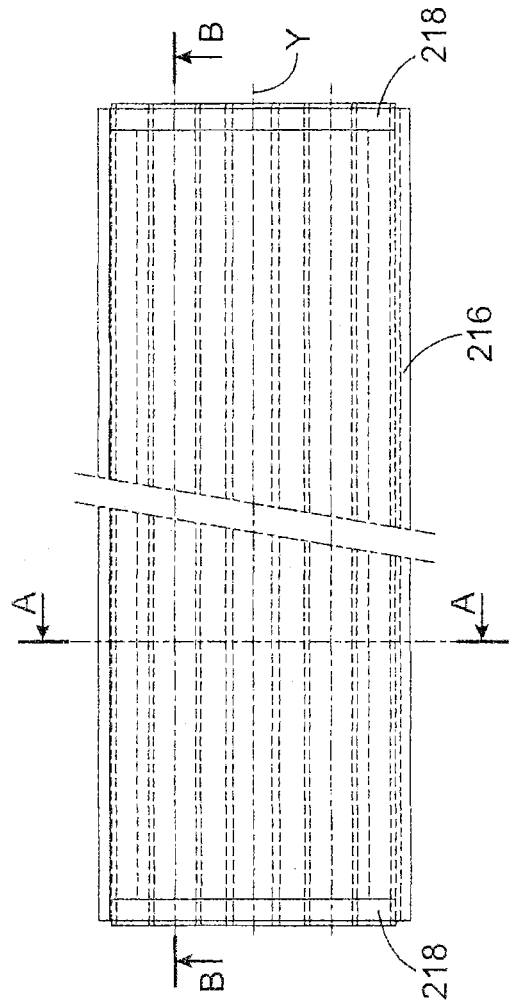
FIG. 5A is a side view of an absorber according to the present invention during the assembly thereof by diffusion welding.
Figure 5C:
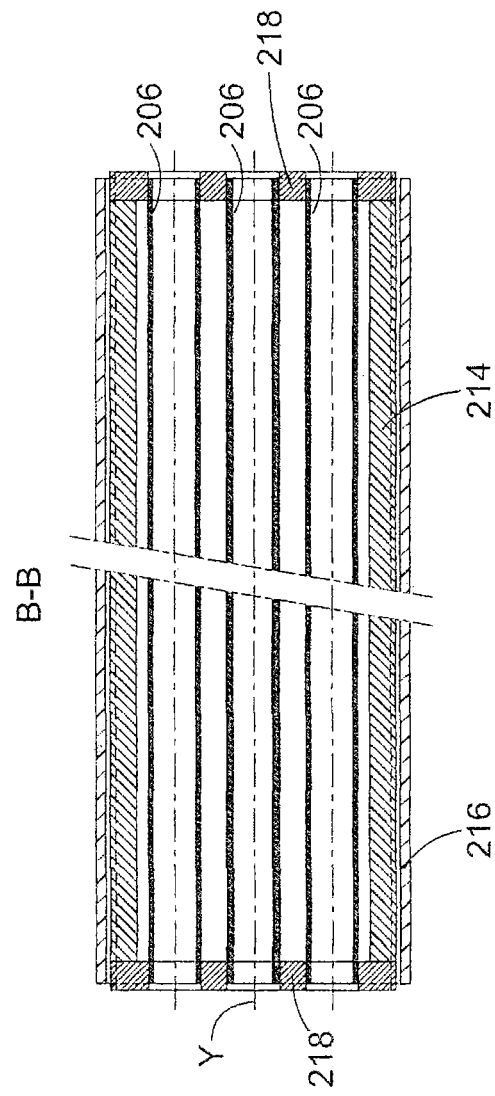
FIG. 5C is a longitudinal section view along the plane B-B of the absorber in FIG. 5A.
Figure 5B:
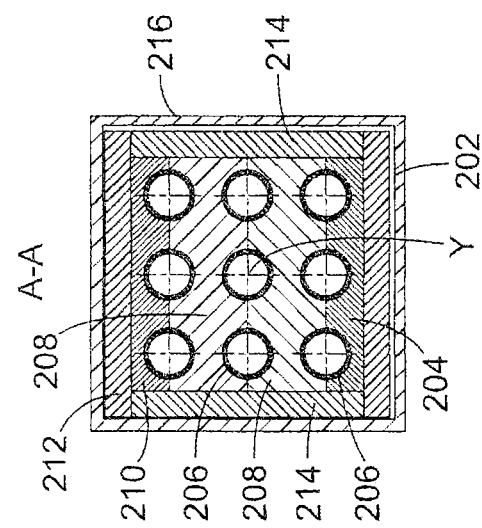
FIG. 5B is a cross-section view along the plane A-A of the absorber in FIG. 5A.

FIGS. 5A to 5C show various views of an embodiment of an absorber according to FIG. 2A prior to the assembly thereof by diffusion welding.

In the example shown, the assembly method consists of stacking plates and tubes to form the absorber.

In this case, the method comprises the following steps:

positioning a stainless steel lower plate 202, arranging a copper plate 204 provided with three longitudinal grooves each acting as a trough for a stainless steel tube, on the lower plate 202, arranging a stainless steel tube 206 in each of the grooves, covering the tubes with a copper plate 208 provided with grooves on the lower face thereof, such that the tubes are surrounded by copper. The copper plate is provided on the upper face thereof with three grooves each acting as a trough for a stainless steel tube, forming a second tube layer, arranging a stainless steel tube 206 in each of the grooves, covering the tubes with a copper plate 208 provided with grooves on the lower face thereof, such that the tubes are surrounded by copper. The copper plate is provided on the upper face thereof with three grooves each acting as a trough for a steel tube, arranging a stainless steel tube 206 in each of the grooves, forming a third tube layer, covering with a copper plate 210 provided with grooves on the lower face thereof with grooves, the upper face being plane, arranging a stainless steel plate 212, laterally arranging stainless steel plates 214 over the entire height and entire length of the stack, placing the assembly formed in a gas-tight casing 216 wherein a vacuum is created, and provided with longitudinal panels 218 drilled with holes for inserting the longitudinal ends of the tubes 206; the end of the tubes is tightly welded onto the casing 216.

then arranging the casing in a high-temperature atmosphere, and injecting a pressurised gas entering the tubes and outside the casing, applying a force onto the stack. After hot isostatic pressing, the casing 216 is removed by machining and the enclosure 214 is thinned in the central part of the absorber.

In the example shown, the absorber comprises three layers of three tubes, but this is in no way limiting. Furthermore, the choice of materials is merely given as an example.

Moreover, copper plates 204, 208 and 210 of different grades may be chosen.

Obviously, it is possible to envisage producing a solar receiver by assembling a plurality of absorbers as described above, wherein the absorber tubes are interconnected. It is also possible to envisage stacking plates wherein some are perforated and define the tube passages directly. The core could also be produced from powder wherein the tubes are embedded.

Figure 9:
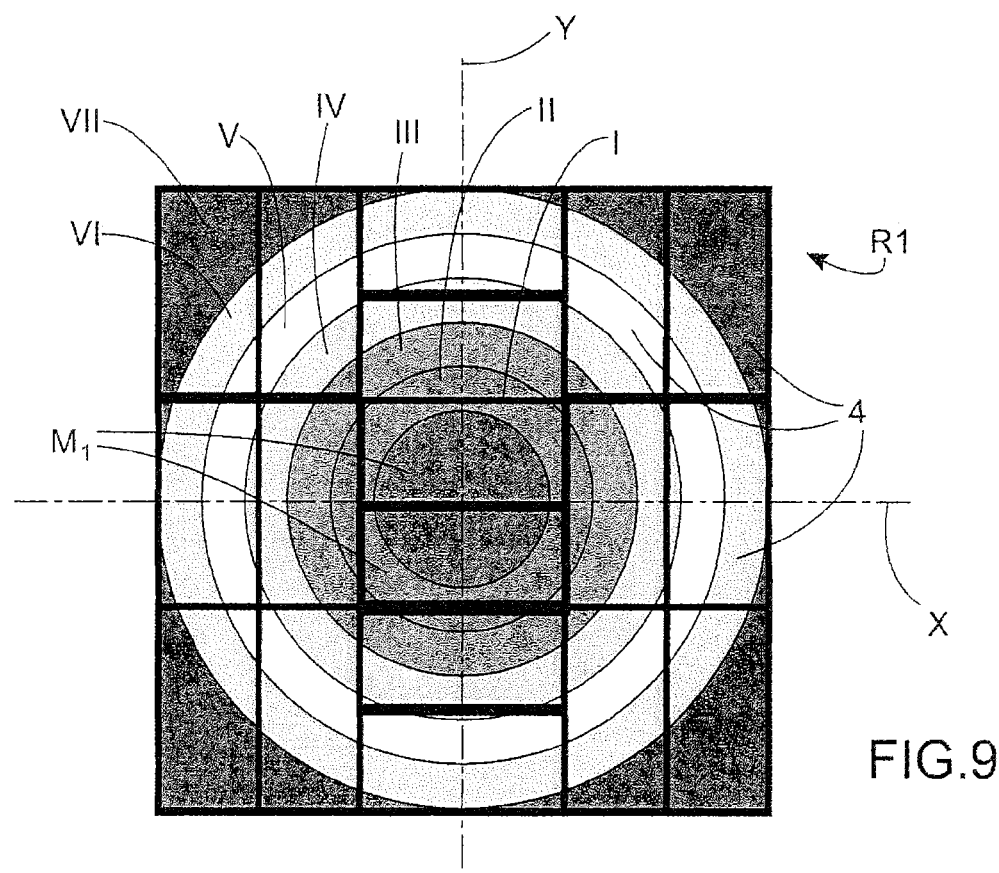
FIG. 9 is a schematic representation of a second embodiment of a receiver according to the present invention superimposed with the solar flux map.

FIG. 9 shows an example of an embodiment of a receiver R2 according to a particularly advantageous second embodiment comprising a plurality of absorbers 4 according to the present invention. The absorbers 4 are arranged side by side so as to form a substantially continuous paving. A gap j is provided between the edges of two adjacent absorbers so as to enable free expansion of each of the absorbers without any risk of contact and damage.

The gap j is dependent on the constituent materials of the absorbers, more specifically of the expansion coefficients thereof. The gap j is not necessarily identical between all the absorbers, this may for example be the case if not all the absorbers are made of the same material.

The gap may for example be between 1 and 15 mm, for example of about 7 mm.

For example, if the absorbers are made of stainless steel or a nickel-based alloy, a gap in the region of 7 mm equivalent to the expansion may be provided. The gap between the absorbers is suitable for calculation on the basis of the general knowledge of those skilled in the art.

In the example shown, the paving is square.

Figure 10:
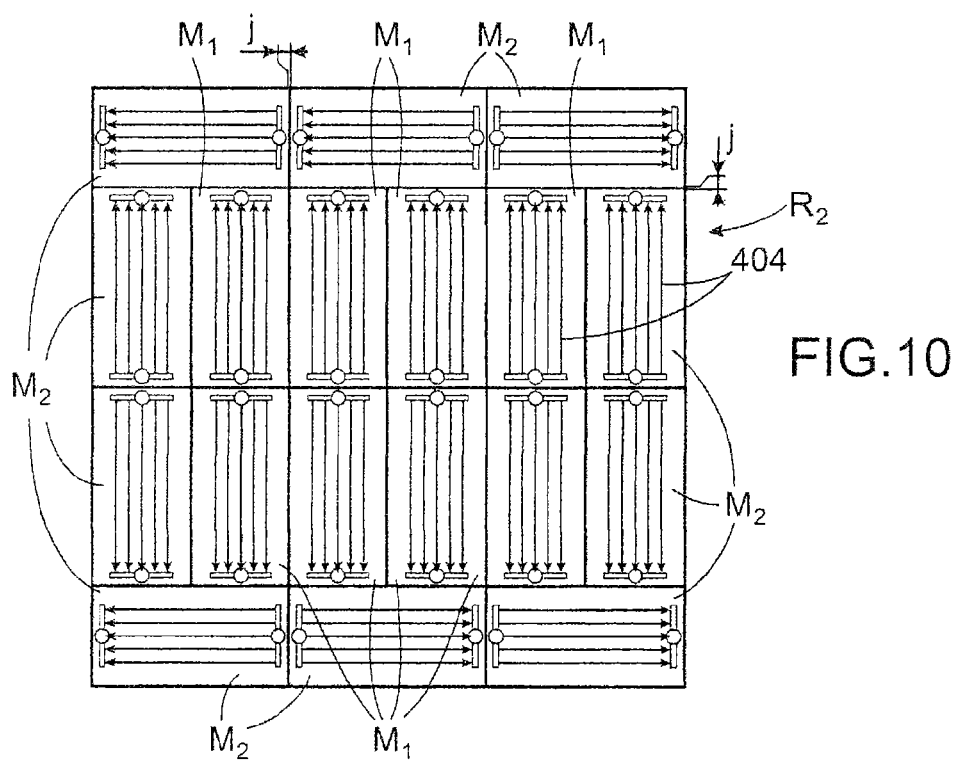
FIG. 10 is a schematic representation of a further example of a receiver according to the second embodiment.
Figure 11A:
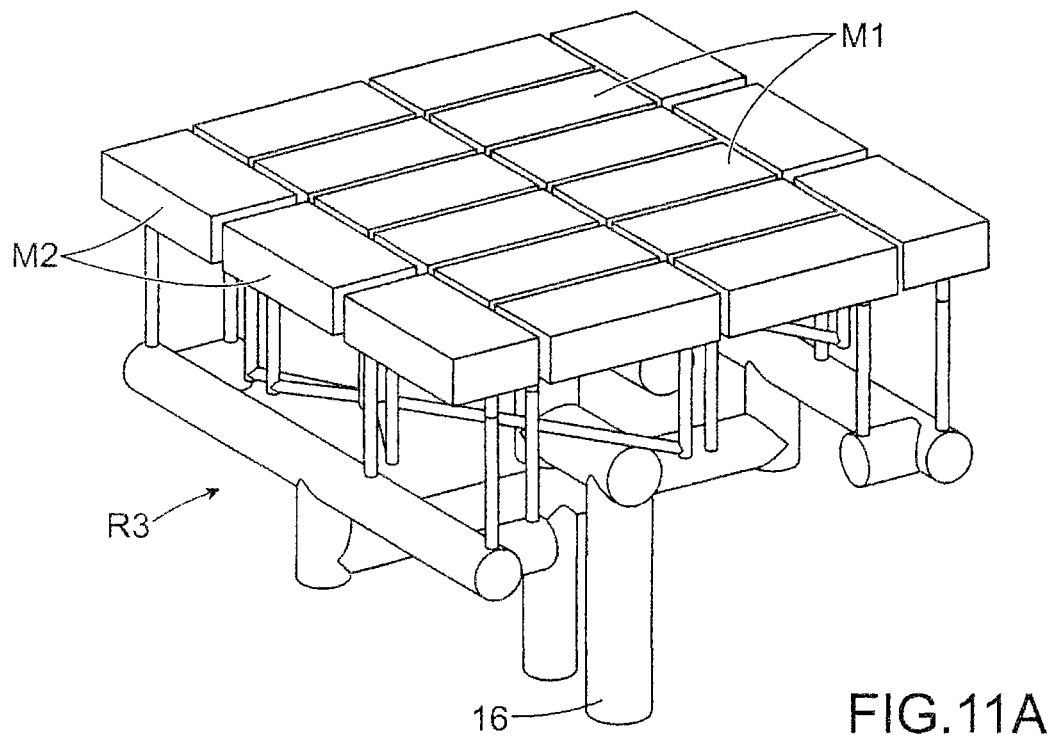
FIGS. 11A and 11B are schematic perspective views of the front face and rear face, respectively of a practical embodiment of the receiver in FIG. 10, FIGS. 12, 13 and 14 are schematic representations of various connection modes between absorbers of a receiver according to the second embodiment.
Figure 11B:
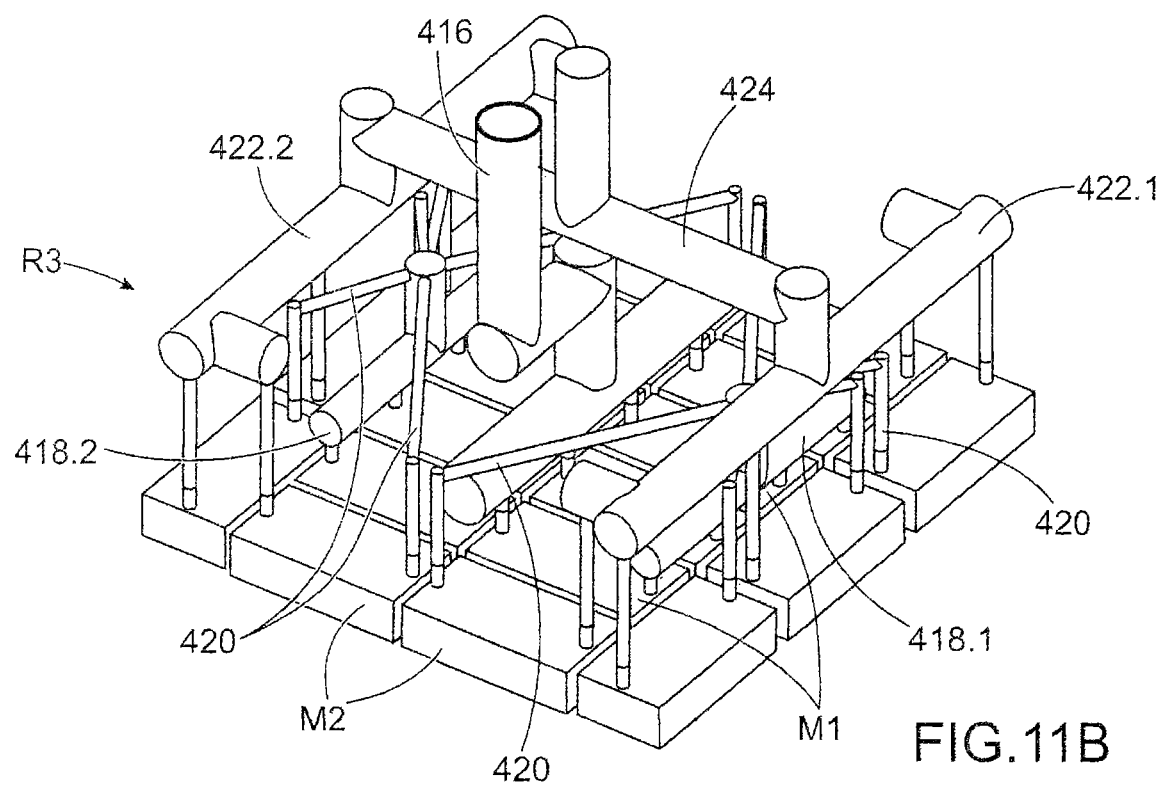

Moreover, according to the present invention, each absorber comprises its own fluid circuit 402 shown in FIG. 11B and represented schematically by the arrows 404 in FIG. 10 of the other example of an embodiment, enabling considerable freedom in the embodiment of a fluid circuit.

In the example shown, the receiver comprises 18 absorbers.

The absorbers, in the example shown, are rectangular.

In FIG. 9, the characteristic concentrated solar flux map of a power tower is overlaid schematically on the receiver. This map comprises substantially concentric areas, the darkest area receiving the maximum solar flux and the lightest area receiving the minimum solar flux.

The area receiving the maximum flux is situated in the centre of the map and is referenced I, and the area receiving the minimum flux is the outermost area and is referenced VII, the intermediate areas are referenced II to VI.

The solar power plant heliostats are oriented such that the area I covers a central area of the receiver.

In this case, the absorbers are preferably oriented such that they encounter the lowest number of areas I to VII so as to be subject to a relatively invariant flux. For example, the central absorbers are situated essentially in the area I and to a lesser extent in the area II. Preferably, the orientation of the absorbers is such that at least the majority of the absorbers are not illuminated by the six areas I to VII.

In this way, by means of the modular embodiment according to the invention, the absorbers receive fluxes of similar intensities, and not both the maximum flux and the minimum flux.

Alternatively, the two central absorbers M1 may be oriented such that the lengths thereof extend parallel to the axis Y and offer identical operation to the arrangement in FIG. 9.

Hereinafter in the description, a distinction will be made between two categories of areas, high-flux areas and the absorbers M1 situated in this area and low-flux areas and the absorbers M2 situated in this area.

Obviously, the greater the number of absorbers, and as such the smaller the surface area thereof, the lower the lack of homogeneity of the flux at the surface of each absorber. This increases the precision of the limits between the regions defined by the absorbers and it is thus possible to approximate the shape of the different flux areas.

It is also possible to envisage having absorbers of various shapes in the same receiver so as to enhance precision further.

However, for economical and practically design reasons, since each absorber has its own fluid connection, it is generally chosen to limit the number of absorbers and thus have some lack of homogeneity of the flux on some or all of the absorbers. Moreover, it is generally more economical to arrange a standard absorber instead of a plurality of absorbers, even if the receiver operation is not optimal.

For example, the absorbers are positioned on a support frame provided with cross-beams so as to bear the load of each of the absorbers. The absorbers are preferentially not rigidly connected to the support to limit problems associated with a difference in heat expansion between the absorber material and that of the support frame. For example, the absorbers are positioned on the support, and the fluid supply and fluid discharge tubes provide system flexibility.

Preferably, the tubes are heat-insulated to reduce heat loss at the connections between the absorbers. The heat insulation is of a type known to those skilled in the art.

In this case, it is possible to envisage specifically supplying each absorber according to the solar flux illuminating same.

For example, it is possible to envisage supplying the absorbers situated in the high-flux areas with cold fluid and supplying the absorbers situated in the low-flux areas with the fluid outflowing from the high-flux areas.

In this way, for example, the absorbers situated in the high-flux areas are connected in parallel to a source of cold fluid, and are connected in series with the absorbers situated in the low-flux areas.

FIGS. 10, 11A and 11B show a further example of an embodiment of a modular receiver R3 according to the present invention.

FIG. 11A shows the receiver from the side of the face thereof intended to receive the solar flux, and FIG. 11B shows the receiver from the side of the fluid connections between the receiver absorbers on the rear face of the receiver.

As seen in FIG. 9 representing the flux map also applicable to the receiver R3, the high-flux area is situated at the centre and the low-flux area is situated at the outside. The receiver R3 has a simplified distribution with respect to that of the receiver R1 in FIG. 9.

The receiver R3 comprises a total of 18 absorbers, eight absorbers M1 are situated at the centre in the high-flux area and two absorbers M2 are situated at the outside surrounding the absorbers M1 in the low-flux area. It is thus possible to envisage the eight absorbers M1 being connected in parallel and connected in series with the ten absorbers M2. In the example shown, the supply of the absorbers M1 is provided at the centre of the receiver.

The distribution of the absorbers of the receiver R2 is suitable for reproducing the distribution of the solar flux on the receiver. This distribution makes it possible to enhance the operation of the receiver substantially with respect to that of receivers according to the prior art.

FIG. 11B shows an example of a fluid connection circuit between the absorbers of the receiver R3.

The fluid circuit comprises a conduit 416 for supplying the absorbers M1, which are supplied in parallel, two ducts 418.1, and 418.2 for collecting the heated fluid outflowing from the absorbers M1. Each collection duct 418.1, 418.2 collects the heated fluid from four absorbers M1, and redistributes same in four absorbers M2 in parallel via sub-ducts 420.

The outlet fluid from the absorbers M2 is collected via two ducts 422.1, 422.2, connected via a main duct 424 grouping together all the heated fluid outflowing from the receiver. This main duct 424 is connected for example to an area for storing the heated fluid with a view to the use thereof.

Figure 12:
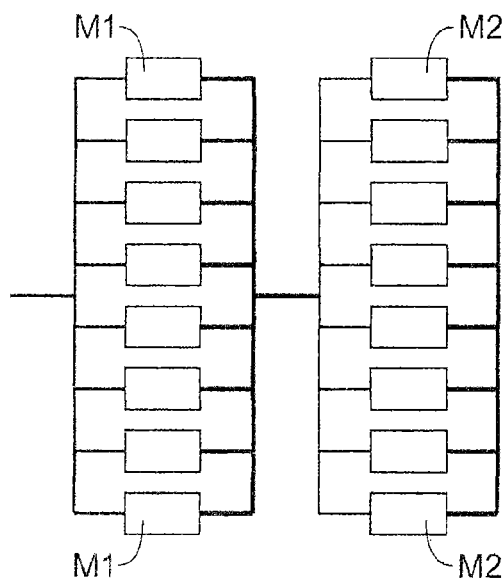
Figure 13:
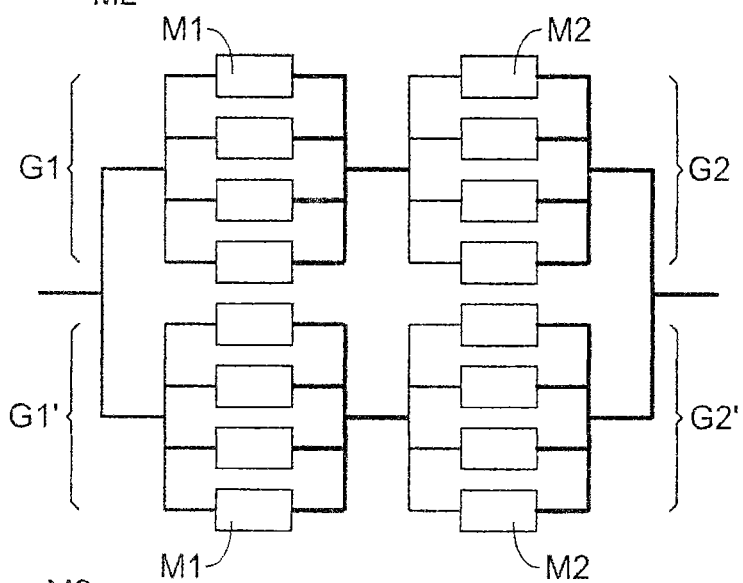
Figure 14:
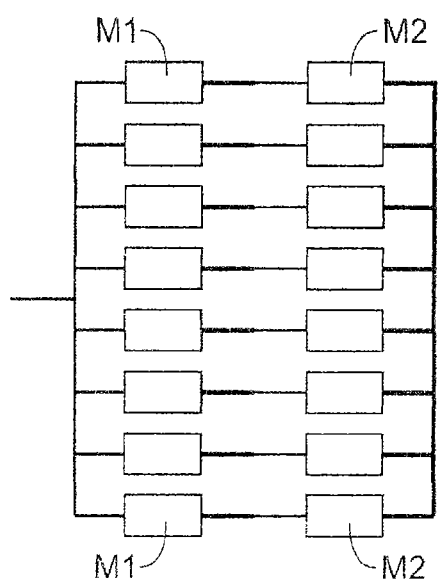

FIGS. 12, 13 and 14 show examples of connection between the absorbers M1 situated in a high-flux area and the absorbers M2 situated in the low-flux area.

In FIG. 12, the absorbers M1 are all supplied in parallel. At the outlet of the absorbers M1, the heated fluid in each absorber M1 is collected in parallel and is mixed so as to homogenise the temperature of the fluid before resupplying each of the absorbers M2 in parallel. The heated fluid in the absorbers M2 is also collected in parallel. This connection mode offers the advantage of homogenising the temperature of the fluid between each flux area.

FIG. 13 shows a further example of connection of the absorbers M1 and M2.

In this example, absorber sub-groups are created, in particular each flux area comprises eight absorbers, two sub-groups G1, G1' of four absorbers M1 are produced in the high-flux area, and two sub-groups G2, G2' of four absorbers M2 are produced in the low-flux area.

The two sub-groups G1, G1' are supplied in parallel, the absorbers in each sub-group are supplied in parallel.

Each sub-group G1, G1' is connected in series to a sub-group G2, G2', and the absorbers M2 of each of the sub-groups G2, G2' are supplied in parallel.

The fluid at the outlet of the sub-groups G2, G2' is collected in parallel and the fluids collected in each of the sub-groups are mixed.

FIG. 14 shows a further example of connection, wherein the absorbers M1 are supplied in parallel and each absorber M1 is connected in series with an absorber M2, the fluid at the outlet of the absorbers M2 is collected in parallel.

Obviously, the receiver may comprise more than two flux areas, and consequently, the connections described in FIGS. 12 to 14 are suitable for distribution of the absorbers into three or more solar flux areas.

Preferably, the connection fluid circuit architecture is such that it generates an identical or quasi-identical fluid flow rate between the absorbers. In this case, the circuit design accounts for head losses generated by the absorbers and by the diameter of the ducts selected.

As explained above, the absorbers are arranged side by side so as to form a substantially continuous paving. A gap j is provided between the edges of two adjacent absorbers so as to enable free expansion of each of the absorbers, thus reducing the risks of contact between the absorbers and the damage thereof.

Figure 15:
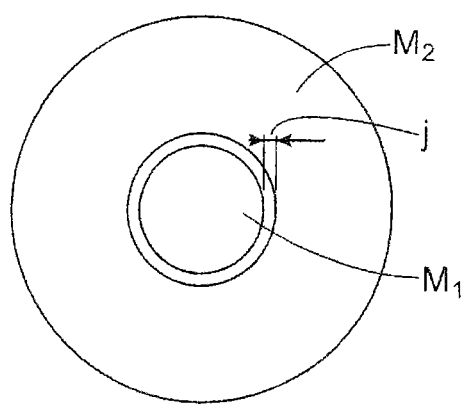
FIG. 15 is a schematic representation of a further example of a modular receiver according to the second embodiment.

FIG. 15 shows a further example of an embodiment wherein the receiver R4 has a circular shape and comprises two concentric absorbers, a first circular central absorber M1 subject to the high flux and an annular outer absorber subject to the low flux M2. A gap j is provided between the edge of the first absorber and the inner edge of the second absorber.

Obviously, a modular receiver having any other shape and comprising absorbers having any shape, for example rectangular, rhombic, elliptical or of any shape, does not leave the scope of the present invention.

The absorber in FIG. 2C is particularly suitable for the embodiment of a modular receiver according to the invention. Indeed, the tubes 10 open into the rear face 7 of the absorber and the collectors 16 are also arranged on the rear face.

In this case, the collectors 16 are not subject to the solar flux, the temperature stress is thus reduced, limiting the risks of damage thereof. In this case, the collectors may be made of materials having a lower temperature resistance and generally a lower cost price. Moreover, if the collectors were to be connected to the tubes by soldering, the risks of leakage are reduced.

Moreover, arranging the tube outlets and the collectors on the rear face makes it possible to increase the effective surface area of the receiver. Indeed, as seen in FIGS. 9 to 12B, almost all the surface of the receiver facing the solar flux is used for transmitting the energy from the solar flux to the fluid. Indeed, the entire surface of the receiver consists of the faces 6 of the absorbers, apart from the spaces between the absorbers forming idle areas; however, the width thereof may be optimised so as to reduce the surface areas thereof.

Also advantageously, it is envisaged for the connection between the tubes 10 and the outer fluid circuit to be suitable for absorbing the differential expansions between the absorbers. Expansion bellows may be used for this purpose.

More advantageously, supply tubes are produced, directly having a shape suitable for doing away with the need for expansion bellows, for example these act as expansion loops. The collection tubes may also act as expansion loops, however, the expansion problem is less severe since they are traversed by a heated fluid and are also subject to expansion.

Due to the geometric modularity of the receiver, it is possible to adapt the absorber according to the solar flux in which it is situated. The absorbers situated in the high-flux area are made of one or more high temperature-resistant materials, whereas those situated in the low flux area may be made of materials resistant to lower temperatures. The production cost associated with the absorber materials may then be generally reduced.

Due to the modularity of the receiver, it is possible to produce different fluid circuits and thus optimise the design of the absorbers according to requirements and the sought or required operating conditions.

Figure 16:
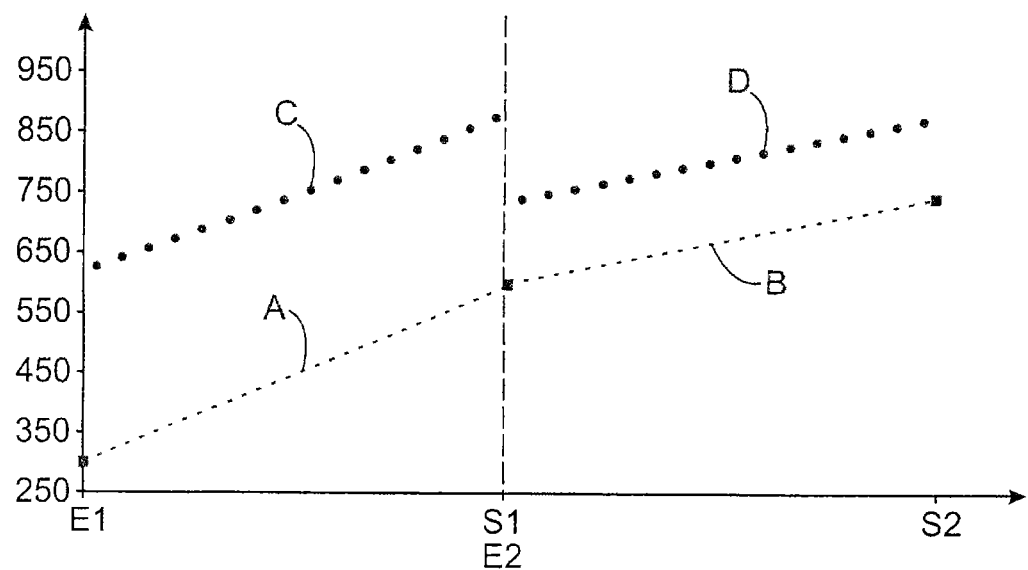
FIG. 16 is a graphic representation of the progression of the temperature in ° C. of the fluid and of the absorber panel to be illuminated if the cold fluid supplies the absorbers situated in a high-flux area, and the absorbers situated in a low-flux area are supplied with the fluid outflowing from the absorbers situated in the high-flux area.

Hereinafter in the description, a receiver consisting of absorbers as shown in FIG. 16 will now be discussed. The panel in question is that bearing the face 6 illuminated by the flux.

If the inlet fluid supplies the absorber situated in the low-flux area, the panel temperature is moderate. Typically with a fluid inlet temperature of 300° C., the panel temperature is in the region of 550° C. A stainless steel may be used to produce the absorber. On the other hand, the absorber situated in the high-flux area is supplied with a fluid already preheated by the absorber situated in the low-flux area and, due to the exposure to the high flux, the panel temperature reaches approximately 1000° C.

Different materials between absorbers may be chosen, based on the flux area wherein it is situated. Taking into consideration that the cost price of a less heat-resistant material is generally lower than a more temperature-resistant material, the production cost of the receiver may be optimised.

FIG. 16 shows the progression of the temperature T in ° C. of the fluid or the absorber panel bearing the face 6 when the cold fluid supplies the absorbers situated in the high-flux area and the absorbers situated in the low-flux area are supplied by the fluid outflowing from the absorbers situated in the high-flux area.

E1 refers to the absorber inlet in the high-flux area; S1 refers to the absorber outlet in the high-flux area; E2 refers to the absorber inlet in the low-flux area; and S2 refers to the absorber outlet in the low-flux area.

The temperature of the absorber panel situated in the high-flux area is shown by curve C.

The temperature of the absorber panel situated in the low-flux area is shown by curve D.

The temperature of the fluid circulating in the absorber situated in the high-flux area is shown by curve A.

The temperature of the fluid circulating in the absorber situated in the low-flux area is shown by curve B.

It is noted in this example of fluid supply that the absorber panel temperatures are quasi-identical. It is then possible to use absorbers having the same temperature resistance properties. In this specific case, the maximum absorber temperature is 900° C., nickel-based alloys may then be used.

Obviously, the receiver according to the present invention may have any type of fluid connection, for example but not in a limiting manner:

all the absorbers may be supplied in parallel by a cold fluid source, regardless of the flux received by each absorber, as described above, it is possible to envisage supplying the absorbers situated in the high-flux area with the cold fluid in parallel, the absorbers situated in the low-flux area being supplied by the fluid outflowing from the absorbers situated in the high-flux area; or as also described above, supplying the absorbers situated in the low-flux area with the cold fluid in parallel, the absorbers being supplied by the fluid outflowing from the absorbers situated in the low-flux area.

Alternatively, it may be advantageous to connect two or a plurality of absorbers in series and connect groups of absorbers connected in series in parallel. For example, if the receiver comprises 16 absorbers, pairs of absorbers are advantageously connected in series so as to no longer have merely 8 connections in parallel, making it possible to reduce the flow rate disparities between the absorbers and thus reduce the risk of the appearance of hot spots. Moreover, fluid distribution is enhanced since the head losses are increased with respect to 16 parallel connections. While connecting in series makes it possible to reduce the risks of poor fluid distribution with respect to an entirely parallel arrangement, it is advisable to re-mix the fluid outflowing from the absorbers M1 such that the fluids supplying the absorbers M2 have identical temperature levels, as represented schematically in FIG. 9.

With this example of a modular receiver according to the present invention, it is possible to obtain a fluid outflowing from the absorbers with similar temperatures, which is not the case with receivers according to the prior art consisting of tubes arranged side by side, from one edge to an opposite edge of the receiver. Indeed, each tube does not receive the same flux, which varies along the length of each tube, the temperatures of the fluid outflowing from each tube varying considerably, which may be detrimental to the downstream elements from the receiver. Re-mixing at the outlet of the absorbers M1 is thus of particular interest to prevent damage on the downstream elements.

Moreover, the modular receiver according to the present invention offers the advantage of involving simplified maintenance. Indeed, if an absorber is defective, for example in the event of leak, it may be replaced individually, without requiring replacement of the full receiver. Furthermore, this replacement reduces the shutdown time of the solar power plant considerably. Besides the reduced repair cost, the service time is reduced substantially, particularly as it is possible to have some absorbers in stock, unlike a full receiver.

The receiver according to the present invention also offers the advantage of being easily adapted to modify the output thereof. Particularly when producing receivers having higher outputs, it is simply necessary to increase the number of stages and the number of absorbers per stage.

The invention claimed is:

1. An absorber for a solar power tower solar receiver comprising:
   an enclosure in which at least one panel is configured to be illuminated;
   a core made of at least one material with heat conductivity, said core being at least partially encompassed by the enclosure; and
   at least one tube passing through the core and being in thermal contact with said core, said at least one tube extending substantially in a parallel direction with respect to the panel configured to be illuminated, wherein the tube configured for circulation of a fluid to be heated,
   wherein the at least one material of the core has a heat conductivity coefficient greater than or equal to 100 $Wm^{-1}K^{-1}$ ambient temperature such that said core provides thermal inertia within said absorber thereby reducing sudden temperature variations and providing a low thermal gradient within said absorber.

2. An absorber according to claim 1, comprising a plurality of tubes extending substantially in a parallel direction with respect to the panel configured to be illuminated.

3. An absorber according to claim 2, wherein the tubes are distributed into a plurality of layers, each layer comprising a plurality of tubes, the layers being stacked along a substantially normal direction with respect to the panel configured to be illuminated.

4. An absorber according to claim 1, further comprising an additional part made of a material configured to store heat in contact with the core, the additional part not being traversed by the tube.

5. An absorber according to claim 4, wherein the additional part is arranged opposite the panel configured to be illuminated with respect to the core.

6. An absorber according to claim 4, wherein the additional part is integral with the core.

7. An absorber according to claim 4, wherein the additional part includes a reservoir including a phase-change material or a molten metal.

8. An absorber according to claim 7, wherein the reservoir includes a porous material impregnated with a phase-change material.

9. An absorber according to claim 1, wherein the enclosure and the tubes are made of a same material.

10. An absorber according to claim 9, wherein the enclosure and the tubes are made of stainless steel or a refractory material and the core is made of copper, tungsten alloy, or nickel alloy.

11. An absorber according to claim 1, produced by diffusion welding, or by hot isostatic pressing.

12. A solar power tower solar receiver comprising:
at least one absorber according to claim 1;
an inlet collector distributing the fluid in the absorber; and
an outlet collector.

13. A solar receiver according to claim 12, comprising:
a plurality of absorbers arranged side by side forming a paving, a sufficient gap being provided between adjacent absorbers so as to prevent contact between absorbers in event of expansion,
each absorber further comprising its own fluid circuit in which a fluid configured to be heated by the solar flux is configured to circulate, the fluid circuits of the absorbers being interconnected.

14. A solar receiver according to claim 13, wherein the fluid circuit of each absorber comprises a fluid supply inlet and discharge outlet, the inlets and outlets opening into a face of the absorber opposite the face configured to be illuminated.

15. A solar power tower comprising:
a tower;
at least one receiver according to claim 12, mounted on the tower, the at least one tube of the receiver being connected at an inlet to a fluid supply and at an outlet to a system using the heated fluid, at least one heliostat facing the receiver.

16. A solar power plant according to claim 15, wherein the heated fluid is a gas, or is air, and the system using the heated gas is a gas turbine.

* * * * *